Sept. 8, 1964   G. L. MITTELSTEADT   3,147,890
TILTABLE BOTTLE MOUNTING ATTACHMENT FOR POWDER MEASURING DEVICES
Filed April 8, 1963
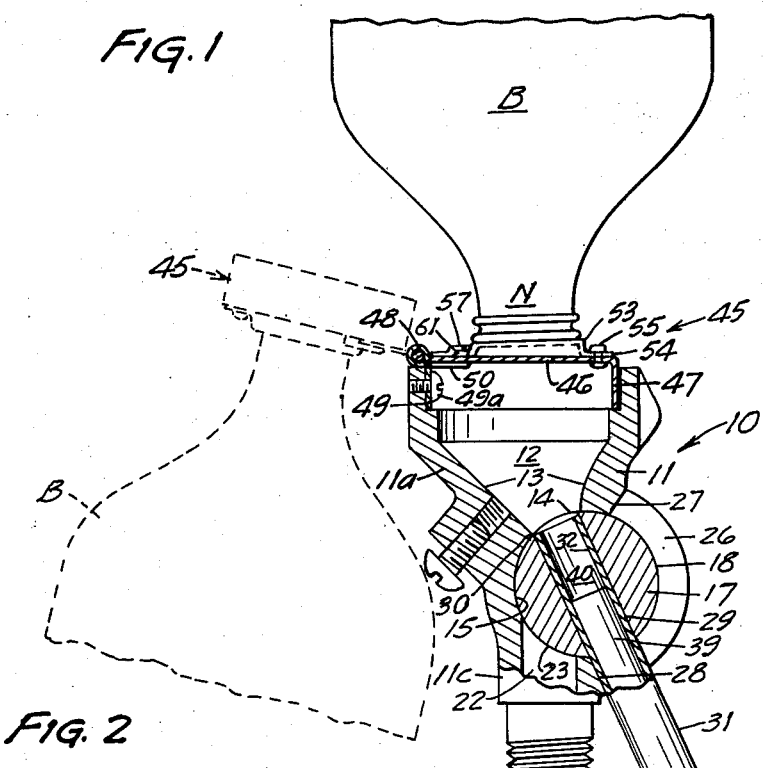
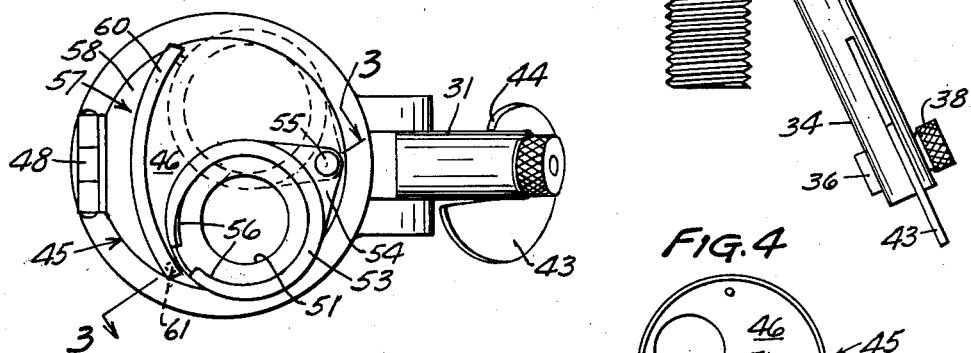
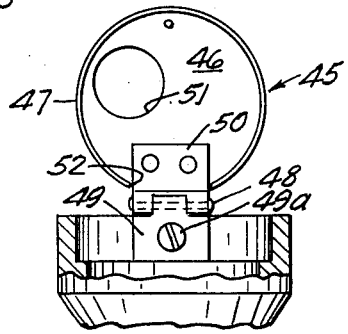
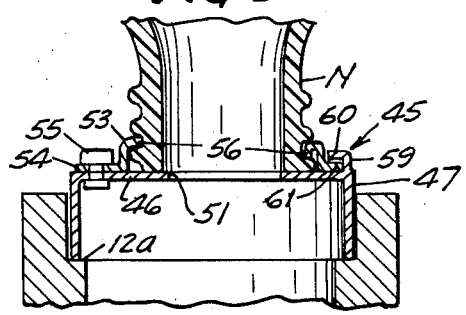
INVENTOR
GLEN L. MITTELSTEADT
BY Williamson & Palmatier
ATTORNEYS United States Patent Office 3,147,890
Patented Sept. 8, 1964

3,147,890
TILTABLE BOTTLE MOUNTING ATTACHMENT
FOR POWDER MEASURING DEVICES
Glen L. Mittelsteadt, Waseca, Minn., assignor to Herter's Inc., Waseca, Minn., a corporation of Minnesota
Filed Apr. 8, 1963, Ser. No. 271,371
5 Claims. (Cl. 222—165)

This invention relates to a powder measuring device and more particularly to a powder measure device having a tiltable powder bottle mounting mechanism.

An object of this invention is the provision in a powder measuring device of a novel bottle mounting mechanism of simple and inexpensive construction which is operable to tiltably move a powder bottle on a powder measure device to permit ready tilting of the bottle between upright and inverted positions, and orienting the powder bottle when in the inverted position for ready dispensing of gun powder therefrom into the hopper of the powder measure device.

Another object of this invention is to provide a powder measure device with a powder bottle mounting mechanism which is operable to releasably mount a powder bottle on the powder measure device for tilting movement between an upright position and an inverter dispensing position so that powder may be readily and accurately dispensed into the measure device with a minimum of effort and with a minimum of spillage.

A more specific object of this invention is to provide a powder bottle mounting attachment which is tiltably attachable to the hopper of a powder measure device and which is arranged and constructed to permit ready opening and closing of the open mouth of the powder bottle while the same is disposed in inverted relation with respect to the powder measure device.

These and other objects and advantages of my invention will more fully appear from the following description made in connection with the accompanying drawings wherein like character references refer to the same or similar parts throughout the several views, and in which:

FIG. 1 is a vertical cross sectional view of a powder measure device incorporating my invention and with certain parts thereof illustrated in adjusted position by dotted line configuration;

FIG. 2 is a top plan view of the invention on an enlarged scale with certain parts thereof illustrated in adjusted position by dotted line configuration;

FIG. 3 is a detailed cross sectional view on an enlarged scale taken approximately along line 3—3 of FIG. 2 and looking in the direction of the arrows; and FIG. 4 is a fragmentary view of a powder measure hopper with the mounting plate of the bottle mounting attachment illustrated in a vertical position.

One form of the present invention is shown in the drawing and is described herein. Referring now to the drawings and more specifically to FIG. 1 it will be seen that a powder measure is indicated in general by the reference numeral 10 and includes a rigid metal housing 11 having an upper portion 11a forming an open top hopper structure 12 for funneling the gun powder downwardly along the downwardly converging hopper walls 13 toward the supply opening 14. The supply opening 14 communicates between the bottom of the hopper structure 12 and the upper portion of a cylindrical rotor-mounting chamber 15 at the intermediate portion of the housing. The cylindrical chamber 15 has a central axis horizontally oriented so as to rotatably or swingably mount a cylindrical rotor 17, the opposite ends of which extend to the exterior of the housing 11. The cylindrical peripheral surface 18 of the rotor is related to the inner peripheral wall surface of the chamber in close fitting and relatively tight-fitting relation so as to prevent any quantities of powder from collecting between these peripheral walls, but also such as to permit turning of the rotor 17 in the chamber 15. Although not shown in the drawing, a handle is attached by screws to the rotor 17 to effect turning of the rotor in the manner of my co-pending application, Serial No. 266,418.

The lower portion 11c of the housing defines a downwardly extending passage 22 therethrough and communicating with the chamber 15 at the discharge port 23 at the lower side of the chamber. The lower portion of the housing 11c is internally and externally threaded to facilitate attachment of the powder measure to a supporting appliance and to facilitate attachment of the other devices as for guiding the measured quantities of powder being discharged.

The intermediate portion of the housing is also provided with an arcuate slot 26 at one transverse side of the chamber 15 and communicating between the chamber 15 and the exterior of the housing. The slot 26 extends arcuately around the periphery of the chamber 15 and rotor 17 with the opposite ends 27 and 28 of the slot being respectively disposed in spaced relation with the supply and discharge ports 15 and 23.

The rotor 17 has an opening 29 extending diametrically therethrough. One end portion 30 of the opening 29 communicates alternately with the supply port 14 and the discharge port 23 as the rotor is revolved in the chamber 15. A rigid tube 31 has its inner end 32 affixed in the opening 29 of the rotor 17 by a suitable set screw and the outer end of the tube extends outwardly through the slot 26. The outer end 34 of the tube 31 is provided with a slot entirely across the opposite sides of the tube so as to bifurcate the outer end 34.

The outer end of tube 31 is also provided with suitable apertures to receive the pivot pin 36 transversely therethrough. The pivot pin 36 has a releasable retaining nut 38 thereon for tightening against the bifurcated end 34 of the tube and also for permitting complete removal of the pin 36 from the tube.

A piston 39 is slidably mounted in tight fitting relation within the tube 31 so as to cooperate with the inner end 32 of the tube and with the opening 29 in the rotor and defining a measuring cell 40 of variable size. The outer end of the piston 39 is provided with an endwise facing cam following surface. Means are provided for controlling the positioning of the piston, such means icnluding a flat plate-like rigid cam 43 having a centrally mounting aperture rotatably mounting upon the circular periphery of the pivot pin 36 so as to facilitate swinging of the cam. The cam lies in the slot defined by the bifurcated end portion 34 of the tube 31 and the latter may be clamped against the cam by tightening the nut 38 so as to retain the cam in any desired orientation.

The cam 43 has an outer camming edge 44 which progressively varies in spacing from the pivot pin 36. This outer camming surface 44 extends substantially around the entire periphery of the cam 43. Although not shown in the drawing, an elongate coil type spring will be provided for continuously urging the outer end of the piston 39 against the camming edge 44 in the manner of my co-pending application, Serial No. 266,418.

The above described structure does not constitute, per se, a part of the instant invention and the particular operation of this powder measure device is clearly set forth in my copending application, Serial No. 266,418. Therefore, additional discussing of the structural arrangement of the various parts of the powder measure device 10 as well as the operation thereof are thought to be unnecessary for the instant application.

Means are provided for tiltably mounting the powder bottle on the powder measure 10 to facilitate charging or supplying the hopper structure 12 with powder during a loading or reloading operation. This means includes a powder bottle mounting mechanism or attachment 45 which is comprised of a substantially flat circular powder bottle mounting plate or member 46 having a downturned annular flange 47 integrally formed therewith. The mounting plate 46 is hingedly mounted on the hopper structure 12 by means of a hinge 48. It will be seen that one leaf 49 of hinge 48 is rigidly connected to the inner peripheral surface of the hopper structure 12 by means of a bolt 49a while the other hinge leaf 50 is affixed to the lower surface of the mounting plate 46. Thus it will be seen that the mounting plate 46 is swingably mounted on the hopper structure 12 for vertical swinging movement between a first or operative position as illustrated in the full line configuration of FIG. 1 and a second or inoperative position as illustrated by the dotted line configuration of FIG. 1.

It will be noted as best seen in FIGS. 1 and 3 that the lower peripheral edge of the annular flange 47 engages the annular shoulder 12a of the hopper structure 12 when the mounting plate 46 is in the operative position to horizontally orient the same in traversing relation with the open top of the hopper structure. The mounting plate 46 is also provided with an eccentrically located supply opening 51 therein. This opening 51 is of circular configuration and as best seen in FIG. 3 is slightly smaller than the cross sectional area of a conventional powder bottle neck. It will also be noted that the annular flange 47 is recessed as at 52 and through which projects the hinge leaf 50 of the hinge 48. The function of this recess will be set forth more fully hereinbelow.

Means are also provided for releasably and shiftably securing a conventional powder bottle on the mounting plate 46 and to this end a bottle engaging or coupling member 53 is shiftably mounted on the mounting plate 46. It will be seen that the bottle engaging member 53 is of annular construction and is provided with an attachment ear 54 which is suitably apertured for receiving pivot pin 55 therethrough to pivotally connect the bottle engaging member 53 upon the upper surface of the mounting plate 46. It will be noted that the annular bottle engaging member 53 is provided with an inturned helical edge 56 of a size to permit threaded engagement thereof with the conventionally threaded neck end of a conventional powder bottle B. It will be seen that the powder bottle will be disposed in an inverted position when the mounting plate 46 is in the operative position.

It will also be seen that the bottle engaging member 53 is swingable between a bottle dispensing position and a closed position relative to the mounting plate 46. The bottle engaging member is illustrated in the bottle dispensing position in full lines in FIG. 2 and is illustrated in a bottle closing position in dotted line configuration. Thus it will be seen that when the bottle engaging member 53 is in the bottle dispensing position, this annular member as well as the open mouth of the bottle carried thereby will be disposed in communicating or registering relation with respect to the aperture 51. However, when the bottle engaging member 53 is in the bottle closing position, the open mouth of the inverted powder bottle will be obstructed or closed by the imperforate portion of the mounting plate 46.

Means are also provided for guiding the pivotal or swinging movement of the bottle engaging member 53 during shifting movement thereof and for releasably locking the bottle engaging member in said bottle closing and dispensing positions. To this end it will be seen that a mounting plate 46 is provided with a track or guide defining structure 57 including a substantially flat attachment portion 58 affixed to the upper surface of the mounting member 46 by welding or the like, as best seen in FIG. 2. Referring now to FIG. 3 it will be seen that the flat attachment portion 58 has an upwardly extending flange element 59 integrally formed therewith, the latter being provided with a horizontally extending flange 60 which cooperates with the upper surface of the mounting plate 46 to define the guide or track. It will be noted that the flanges 59 and 60 are of arcuate configuration, as best seen in FIG. 2 and that the arcuate track is spaced in opposed relation to that side portion of the mounting plate adjacent which the pivot pin 55 is located.

The annular bottle engaging member 53 is provided with a track engaging or guide element 61 which is movable in the arcuate track during swinging movement of the bottle engaging member 53. The ends of the arcuate track are closed to prevent disengagement of the track engaging element 61 therefrom and to limit swinging movement of the bottle engaging member 53. Thus it will be seen that when the bottle engaging member is swung to the full line position as illustrated in FIG. 2 so that the track engaging element 61 engages the end of the track located adjacent the aperture 51, the bottle engaging member will be positioned in the bottle closing position as illustrated by dotted line configuration of FIG. 2 and the bottle carried thereby will have its open mouth obstructed by the upper surface of the mounting plate 46.

In operation, the mounting plate 46 will be swung outwardly to the second or inoperative position as illustrated in dotted line configuration of FIG. 1. The closure cap on a powder bottle will be removed and the threaded neck of the bottle will be screwed or threaded into engagement with the helical edge 56 of the bottle engaging member 53. This bottle engaging member will then be positioned in bottle closing relation so that the mouth of the bottle will be obstructed by the upper surface of the mounting plate 46. The neck of the bottle is then screwed tightly against the upper surface of the mounting plate 46 at which time the open mouth of the bottle will not only be sealingly urged against the upper plate surface but the track engaging element 61 will be simultaneously urged upwardly against the flange 60 of the track structure 57. This binding engagement of the track engaging element 61 and the flange 60 serves to lock the bottle engaging member 53 in the bottle closing position. The mounting plate 46 along with the attached bottle will then be swung to the operative position whereby the annular flange 47 will engage the shoulder 12a of the hopper structure 12.

The bottle B will then be unscrewed partially to move the periphery of the mouth out of sealed engagement with the upper surface of the mounting plate 46 and simultaneously disengaging the track engaging element 61 from binding relation with respect to the flange 60. The bottle engaging member 53 and the bottle B secured thereto may then be swung to the bottle dispensing position as illustrated in full line configuration of FIG. 2 and at which time the track engaging element 61 will be disposed in engaging relation with the adjacent closed end of the track structure 57. The bottle will then be rotated in a direction to screw the neck thereof into sealing engagement with the upper surface of the mounting plate 46 and to simultaneously urge the track engaging element 61 into binding engagement with the flange 60 so that the bottle engaging member 53 and the bottle carried thereby will be locked in the bottle dispensing position. The powder will flow through the supply opening 51 in the mounting plate 46 and into the hopper structure 12. The piston 39 will have been placed in the proper position for adjusting the cell 40 to the desired volume measure and powder will flow downwardly into the cell 40 when the rotor 17 is in the position illustrated in FIG. 1. Thereafter the rotor will be swung until the cell 40 is in communicating relation with the port 23 and passage 22 at which time the powder will be dispensed from the dispensing unit.

When the powder dispensing operation is completed, the mounting plate may be swung outwardly to the inoperative position with the bottle attached thereto and another step in the loading operation may be performed. It will be noted that when the mounting plate 46 is inverted as illustrated in dotted line configuration in FIG. 1, the lower surface of the plate and the flange 47 cooperate to define a funnel structure and powder material may be discharged therefrom with a funneling effect through the recess 52 in the flange 47.

It will be seen that the bottle mounting mechanism 45 permits ready attachment of a powder bottle on a powder measure so that the powder bottle may be swung into and out of powder dispensing relation with respect to the hopper structure of the powder measure. This particular arrangement permits mounting of the bottle on the powder measure thus enabling the operator to have both hands free for the dispensing and shell loading operation. This unique construction of the bottle mounting mechanism also minimizes any tendency of spillage or loss of the powder material during attachment and removal of the powder bottle to the bottle mounting mechanism.

It will therefore be seen that I have provided a novel bottle mounting attachment which is readily connectible to a powder measure device and which is operable to permit mounting of the powder bottle in an inverted dispensing relation on the hopper structure of a powder measure device.

It will also be noted from the preceding paragraphs that because of the unique construction of the bottle engaging member of my bottle mounting mechanism, the powder bottle may be effectively locked in a closed or powder dispensing position thus minimizing any tendency of spillage of powder during swinging movement of the bottle mounting mechanism.

Thus it will be seen that I have provided a novel powder bottle mounting mechanism which is not only of simple and inexpensive construction but one which functions in a more efficient manner than any heretofore known comparable structures.

It will of course be understood that various changes may be made in the form, details, arrangement and proportions of the various parts without departing from the scope of my invention.

What is claimed is:

1. In a powder measuring device comprising an open topped hopper structure and a powder measuring and dispensing mechanism connected with said hopper structure for receiving gun powder therefrom and for measuring and dispensing predetermined amounts of gun powder,
   a bottle mounting mechanism including a mounting plate having an aperture therein adjacent one side thereof and having an upper surface, means hingedly connecting said plate with said hopper structure to permit swinging movement of said plate between first and second positions,
   said plate when in said first position being substantially horizontally oriented and traversing the open top of the hopper structure, and being vertically swingable (about a transverse axis) away from the open top of the hopper structure, to said second position whereby said upper surface is inverted,
   an annular bottle engaging member shiftably mounted on said plate and for shifting movement relative thereto between bottle dispensing and closed positions and having an inturned helical edge for threadedly engaging the threaded neck of an inverted powder bottle,
   said bottle engaging member when in said bottle dispensing position being disposed in registering relation with said aperture and being shiftable to said bottle closed position so that said plate is disposed in obstrutcing relation with respect to the mouth of the powder bottle,
   and cooperating guide and retaining elements on said bottle engaging member and plate respectively for guiding shifting movement of said botle engaging member between said bottle dispensing and closed positions, and being urged into releasable engagement with each other to lock said bottle engaging member in one of said positions when the neck of the powder bottle carried thereby is progressively threaded into said bottle engaging member.

2. In a powder measuring device comprising an open topped hopper structure and a powder measuring and dispensing mechanism connected with said hopper structure for receiving gun powder therefrom and for measuring and dispensing predetermined amounts of gun powder,
   a bottle mounting mechanism including a substantially flat mounting plate having an aperture therein adjacent one side thereof and having an upper surface,
   means hingedly connecting said plate with said hopper structure to permit swinging movement of said plate between first and second positions,
   said plate when in said first position being substantially horizontally oriented and traversing the open top of the hopper structure, and being vertically swingable about a transverse axis away from the open top of the hopper structure to said second position whereby said upper surface is inverted,
   an annular bottle engaging member pivotally mounted on the upper surface of said plate for pivotal movement relative thereto between bottle dispensing and closed positions and having an inturned helical edge for threadedly engaging the threaded neck of the inverted powder bottle,
   said bottle engaging member when in said bottle dispensing position being disposed in registering relation with said aperture and being shiftable to said bottle closed position so that said plate is disposed in obstructing relation with respect to the mouth of the bottle,
   an elongate guide element on said plate, a guide engaging element on said bottle engaging member being disposed in engaging relation with said guide element and cooperating therewith for guiding shifting movement of the bottle engaging member between said bottle dispensing and closed positions,
   said guide engaging element being urged into releasable engagement with said guide element to lock said bottle engaging member in one of said positions when the neck of the powder bottle is progressively screwed into further engaging relation with said bottle engaging member so that the mouth of the bottle sealingly engages the upper surface of the mounting plate.

3. The device as defined in claim 2 wherein said elongate element is of arcuate configuration.

4. In a powder measuring device comprising an open topped hopper structure and a powder measuring and dispensing mechanism connected with said hopper structure for receiving gun powder therefrom and for measuring and dispensing predetermined amounts of gun powder,
   a bottle mounting mechanism including a substantially circular flat mounting plate having an eccentrically located aperture therein and having an upper surface,
   means hingedly connecting said plate with said hopper structure to permit swinging movement of said plate between first and second positions,
   said plate when in said first position being substantially horizontally oriented and traversing the open top of the hopper structure, and being vertically swingable about a transverse axis away from the open top of the hopper structure to said second position whereby said upper surface is inverted,
   an annular bottle engaging member pivotally mounted on the upper surface of said plate for pivotal movement relative thereto about an axis extending substantially normal to the plane of said plate between bottle dispensing and closed positions,
   said bottle engaging member having an inturned helical edge for threadedly engaging the threaded neck of a powder bottle, said bottle engaging member when in said bottle dispensing position being disposed in registering relation with said aperture and being shiftable into said bottle closed position so that said plate is disposed in obstructing relation with respect to the mouth of the powder bottle, and elongate arcuate guide element on said mounting plate, a guide engaging element on said bottle engaging member cooperating with said guide element for guiding pivotal movement of said bottle engaging member between said bottle dispensing and closed positions, said guide engaging element being urged into binding releasable engagement with said guide element to lock said bottle engaging member in one of said positions when the threaded neck of the powder bottle is progressively threaded into said bottle engaging member so that the mouth of the bottle is urged into sealing relation with respect to the upper surface of said mounting plate.

5. In a powder measuring device comprising an open topped hopper structure and a powder measuring and dispensing mechanism positioned below and connected with said hopper structure for receiving gun powder therefrom and for measuring and dispensing predetermined amounts of gun powder, a powder bottle mounting mechanism including a circular substantially flat mounting plate having an eccentrically located aperture therein and having an upper surface, an annular flange integrally formed with said mounting plate and projecting axially downwardly therefrom, means hingedly connecting said plate with said hopper structure to permit swinging movement of said plate between first and second positions, said plate when in said first position being substantially horizontally oriented and traversing the open top of the hopper structure, and being vertically swingable about a transverse axis away from the open top of the hopper structure to said second position whereby said upper surface is inverted, an annular bottle engaging member pivotally mounted on the upper surface of said plate for pivotal movement relative thereto about an axis extending substantially normal to said plate between bottle dispensing and closed positions, said bottle engaging member having an inturned helical edge for threadedly engaging the threaded neck of the powder bottle, said bottle engaging member when in said bottle dispensing position being disposed in registering relation with said aperture and being shiftable to said bottle closed position so that said plate is disposed in obstructing relation with respect to the mouth of the powder bottle carried by said bottle engaging member, an elongate generally arcuate guide element on said mounting plate, a guide engaging element on said bottle engaging member cooperating with said guide element for guiding pivotal movement of said bottle engaging member between said bottle dispensing and closed positions, said guide engaging element being urged into engagement with said guide element to lock said bottle engaging member in one of said positions when the neck of the powder bottle carried by said bottle engaging member is progressively screwed into the latter so that the mouth of the bottle engages the upper surface of said mounting plate in sealing relation therewith.

No references cited.

UNITED STATES PATENT OFFICE
CERTIFICATE OF CORRECTION

Patent No. 3,147,890                            September 8, 1964

Glen L. Mittelsteadt

It is hereby certified that error appears in the above numbered patent requiring correction and that the said Letters Patent should read as corrected below.

Column 6, line 1, for "botle" read -- bottle --; same column 6, line 51, after "gate" insert -- guide --.

Signed and sealed this 5th day of January 1965.

(SEAL)
Attest:

ERNEST W. SWIDER
Attesting Officer

EDWARD J. BRENNER
Commissioner of Patents